United States Patent [19]
Corder et al.

[11] Patent Number: 5,810,422
[45] Date of Patent: Sep. 22, 1998

[54] CONVERTIBLE TOP

[75] Inventors: George A. Corder, Romulus, Mich.; Charles C. Turney, Toledo, Ohio

[73] Assignee: ASC Incorporated, Southgate, Mich.

[21] Appl. No.: 781,448

[22] Filed: Jan. 10, 1997

Related U.S. Application Data

[60] Continuation of Ser. No. 484,472, Jun. 7, 1995, Pat. No. 5,593,202, which is a division of Ser. No. 398, Jan. 4, 1993, Pat. No. 5,429,409.

[51] Int. Cl.$^6$ .................................................. B60J 7/12
[52] U.S. Cl. ........................... 296/108; 296/116; 296/136
[58] Field of Search ..................................... 296/108, 107, 296/116, 136, 121, 37.7

[56] References Cited

U.S. PATENT DOCUMENTS

| | | |
|---|---|---|
| 404,405 | 6/1889 | Haughey . |
| 1,784,279 | 12/1930 | Ellerbeck . |
| 1,988,346 | 1/1935 | Wagner . |
| 2,007,873 | 7/1935 | Paulin . |
| 2,079,232 | 5/1937 | Smith . |
| 2,564,446 | 8/1951 | Parsons . |
| 2,580,486 | 1/1952 | Vigmostad . |
| 2,596,355 | 5/1952 | Ackermans . |
| 2,704,225 | 3/1955 | Anschuetz et al. . |
| 2,768,024 | 10/1956 | Spear, Jr. . |
| 2,768,025 | 10/1956 | Spear, Jr. et al. . |
| 2,770,489 | 11/1956 | Garvey et al. . |
| 2,841,441 | 7/1958 | Evans . |
| 2,856,231 | 10/1958 | Zeman . |
| 2,869,923 | 1/1959 | Mulichak . |
| 2,939,742 | 6/1960 | Dardarian et al. . |
| 3,059,962 | 10/1962 | Harms et al. . |
| 3,271,067 | 9/1966 | Rollman . |

(List continued on next page.)

FOREIGN PATENT DOCUMENTS

| | | |
|---|---|---|
| 493260 | 5/1950 | Belgium . |
| 0246201 | 11/1987 | European Pat. Off. . |
| 0261379A2 | 3/1988 | European Pat. Off. . |
| 0494366A2 | 7/1992 | European Pat. Off. . |
| 0709243A1 | 5/1996 | European Pat. Off. . |
| 0713795A1 | 5/1996 | European Pat. Off. . |
| 1049026 | 8/1953 | France . |
| 3127525A1 | 1/1983 | Germany . |
| 3416286A1 | 10/1984 | Germany . |
| 3342915A1 | 6/1985 | Germany . |
| 3635373A | 4/1988 | Germany . |
| 3635887A1 | 5/1988 | Germany . |
| 3733892A1 | 4/1989 | Germany . |
| 3816060A1 | 11/1989 | Germany . |
| 3903358A | 9/1990 | Germany . |
| 4010276 A1 | 10/1990 | Germany . |
| 91082420 | 12/1992 | Germany . |
| 4211918C1 | 3/1993 | Germany . |
| 4134606A1 | 4/1993 | Germany . |
| 4218380C1 | 5/1993 | Germany . |
| 4307158C1 | 4/1994 | Germany . |
| 4311240C1 | 4/1994 | Germany . |
| 4320603A1 | 1/1995 | Germany . |
| 4324708A1 | 1/1995 | Germany . |
| 4438191C1 | 7/1995 | Germany . |
| 4438190C1 | 11/1995 | Germany . |

(List continued on next page.)

OTHER PUBLICATIONS

Automotive Industries, Feb. 1990, "C&C intrigue", p. 75.
Viper Pure Performance by Dodge/Auto Editors of Consumer Guide®, Publications International, Ltd., pp. 6 and 7, 1993.

*Primary Examiner*—Joseph D. Pape
*Attorney, Agent, or Firm*—Harness, Dickey & Pierce, P.L.C.

[57] ABSTRACT

A convertible top for an automotive vehicle is provided. This convertible top is coupled to the vehicle such that it moves between a raised operative position and a lowered storage position. When in the raised operative position, the convertible top covers the passenger compartment of the vehicle. When in the lowered storage position, the convertible top is stored in the rear seat area and is covered by a portion of the convertible top itself.

16 Claims, 5 Drawing Sheets

U.S. PATENT DOCUMENTS

| | | |
|---|---|---|
| 3,357,738 | 12/1967 | Bourlier . |
| 3,375,037 | 3/1968 | Hunt, Jr. . |
| 3,377,099 | 4/1968 | Podolan . |
| 3,575,464 | 4/1971 | Himka . |
| 3,994,524 | 11/1976 | Lehmann . |
| 4,168,859 | 9/1979 | Breitschwerdt et al. . |
| 4,553,784 | 11/1985 | Trenkler . |
| 4,711,485 | 12/1987 | Maebayashi et al. . |
| 4,712,828 | 12/1987 | Albrecht . |
| 4,720,133 | 1/1988 | Alexander et al. . |
| 4,729,592 | 3/1988 | Tuchiya et al. . |
| 4,746,163 | 5/1988 | Muscat . |
| 4,828,317 | 5/1989 | Muscat . |
| 4,854,634 | 8/1989 | Shiraishi et al. . |
| 4,895,409 | 1/1990 | Konishi et al. . |
| 4,936,626 | 6/1990 | Gmeiner et al. . |
| 4,950,022 | 8/1990 | Pattee . |
| 4,958,882 | 9/1990 | Kolb . |
| 4,984,841 | 1/1991 | Bauer et al. . |
| 5,004,291 | 4/1991 | Bauer et al. . |
| 5,029,932 | 7/1991 | Parr . |
| 5,033,789 | 7/1991 | Hayashi et al. . |
| 5,067,768 | 11/1991 | Fischbach . |
| 5,085,483 | 2/1992 | Alexander ................................ 296/121 |
| 5,090,764 | 2/1992 | Kogawa et al. . |
| 5,118,158 | 6/1992 | Truskolaski . |
| 5,161,852 | 11/1992 | Alexander et al. . |
| 5,195,798 | 3/1993 | Klein et al. . |
| 5,207,474 | 5/1993 | Licher et al. ........................ 296/136 X |
| 5,225,747 | 7/1993 | Helms et al. . |
| 5,303,970 | 4/1994 | Young et al. ........................... 296/37.7 |
| 5,338,085 | 8/1994 | Guckel et al. . |
| 5,429,409 | 7/1995 | Corder et al. . |
| 5,490,709 | 2/1996 | Rahn . |
| 5,520,432 | 5/1996 | Gmeiner et al. . |
| 5,533,777 | 7/1996 | Kleemann et al. . |
| 5,542,735 | 8/1996 | Furst et al. . |

FOREIGN PATENT DOCUMENTS

| | | |
|---|---|---|
| 4431656C1 | 12/1995 | Germany . |
| 4445580C1 | 12/1995 | Germany . |
| 4445941C1 | 3/1996 | Germany . |
| 4445944C1 | 4/1996 | Germany . |
| 19517063C1 | 6/1996 | Germany . |
| 4446483A1 | 6/1996 | Germany . |
| 4445920A1 | 7/1996 | Germany . |
| 19514022C1 | 9/1996 | Germany . |
| 19534584C1 | 9/1996 | Germany . |
| 1951081A1 | 11/1996 | Germany . |
| 19532568C1 | 11/1996 | Germany . |
| 19532567C1 | 12/1996 | Germany . |
| 2-144226 | 6/1990 | Japan . |
| 650980A5 | 8/1985 | Switzerland . |
| 413467 | 7/1934 | United Kingdom . |
| 756531 | 9/1956 | United Kingdom . |
| 2194759 | 3/1988 | United Kingdom . |
| 2257949 | 1/1993 | United Kingdom . |
| 2291113 | 1/1996 | United Kingdom . |
| 2294432 | 5/1996 | United Kingdom . |

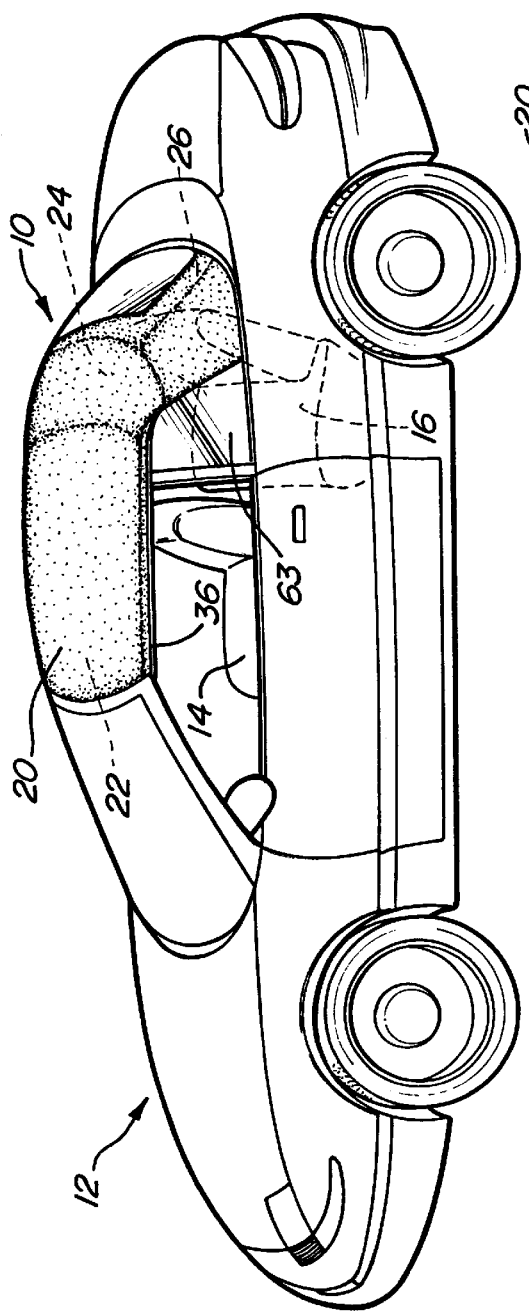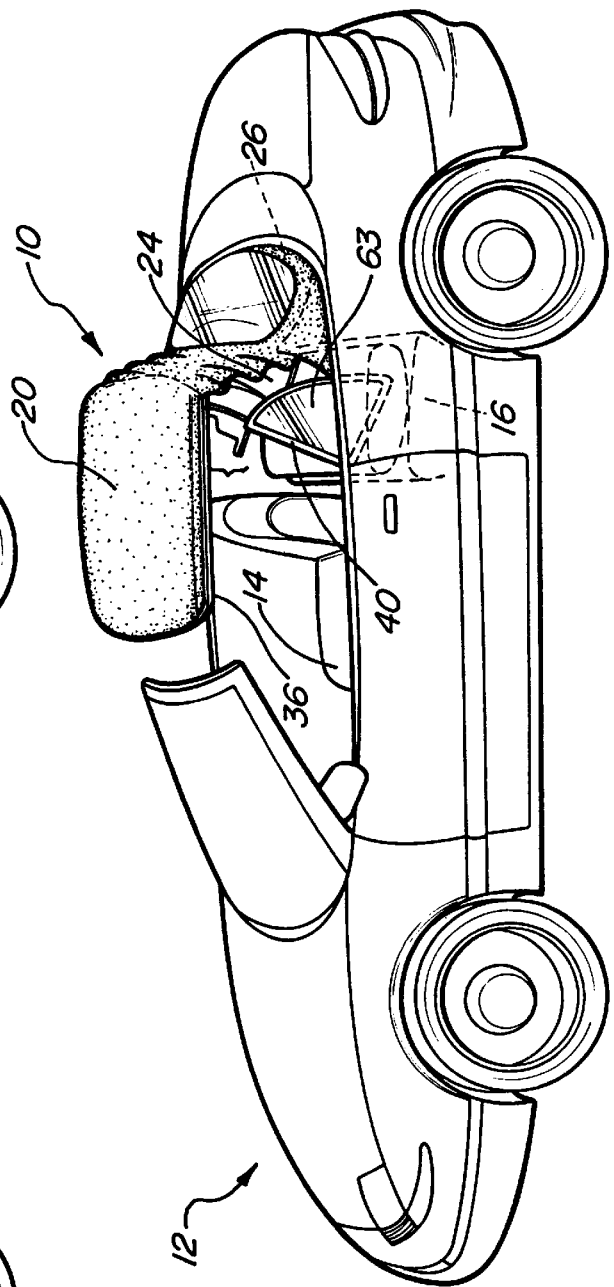

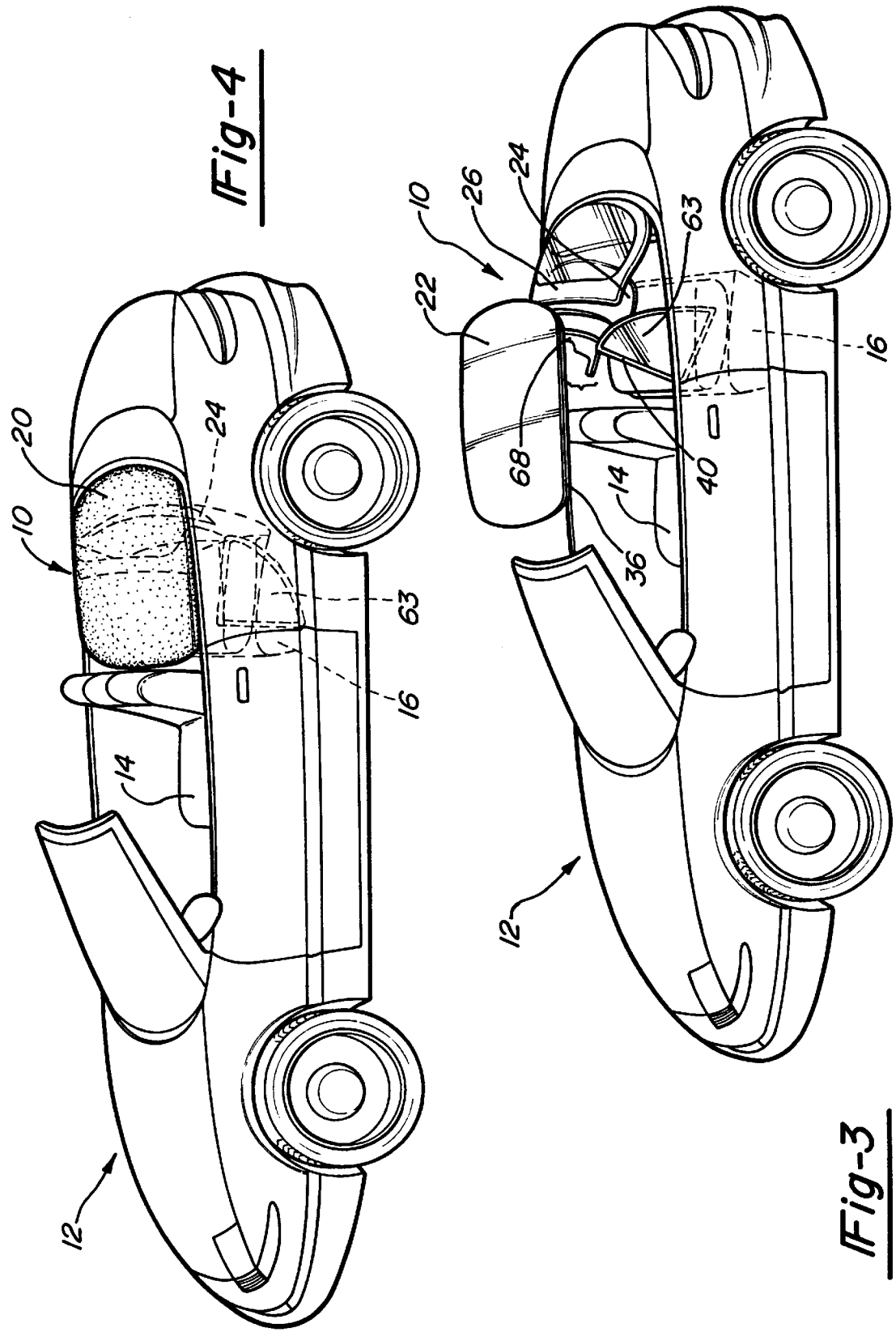

CONVERTIBLE TOP

This is a continuation of U.S. patent application Ser. No. 08/484,472, filed Jun. 7, 1995, U.S. Pat. No. 5,593,202 which is a divisional of Ser. No. 08/000,398, filed Jan. 4, 1993, which issued as U.S. Pat. No. 5,429,409.

BACKGROUND AND SUMMARY OF THE INVENTION

This invention generally relates to convertible tops for automotive vehicles and, more particularly, to a convertible top that is stored in the rear passenger compartment of a vehicle.

Quite often, convertible vehicles are designed by adapting stock, hard top vehicles to accommodate a basic convertible top design. Accordingly, convertible design often requires extensive redesigning of stock suspension systems, passenger compartments, trunk compartments, etc. These design changes often involve undesirable trade-offs in order to accommodate a convertible top assembly and a tonneau for storing the convertible top. In fact, for some vehicles the trade-offs may be too great to permit an efficient convertible design. For example, with a unibody type construction, the rear suspension often utilizes struts that extend upwardly, well into portions of the body traditionally used for a tonneau space. Hence, when converting a unibody type construction to a convertible vehicle, it is often necessary to completely redesign the rear suspension system.

Another disadvantage of converting a stock vehicle to a convertible vehicle is the loss of trunk and passenger space. Traditional convertible designs require a dedicated tonneau for storing the convertible top in its lowered storage position. This tonneau is usually located between the rear seats and the trunk causing a loss of storage space and/or passenger space. Such losses are often an unacceptable trade-off in exchange for the sporty look of a convertible vehicle, particularly in compact vehicles. Moreover, the tonneau requires a separate cover or boot to conceal the folded top in its lowered storage position.

In order to overcome the aforementioned disadvantages, the convertible top of the present invention is provided. This convertible top utilizes a number of unique concepts that not only reduce the above mentioned negative trade-offs, but also enhance the sporty look and utility of the convertible vehicle. Furthermore, the present invention accomplishes this without modifying the underlying design of the hard top, stock vehicle. For example, the convertible top of the present invention does not require a tonneau. Thus, this convertible top can be utilized without modifying the rear suspension, the rear seats or the trunk of the vehicle. Rather, the convertible top of the present invention is collapsed and lowered into a storage position within the rear passenger compartment. In addition, a portion of the convertible top serves as an integral cover that conceals the convertible top within the rear passenger compartment, thereby giving the vehicle the appearance of a two-seater or roadster.

One embodiment of the convertible top of the present invention utilizes a plurality of rigid panels that serve this dual purpose of covering portions of the entire passenger compartment in a raised operative position, while covering the rear passenger compartment in a lowered storage position. By using rigid panels, the show surface of the cover can be matched to the vehicle show surface to enhance its appearance as a roadster. These rigid panels also provide the structure necessary for the convertible top to support components such as dome lights, overhead consoles and/or sunroofs, and to provide a three-dimensional contour to the exterior surface of the vehicle.

Additional objects, advantages, and features of the present invention will become apparent from the following description and appended claims, taken in conjunction with the accompanying drawings.

BRIEF DESCRIPTION OF THE DRAWINGS

FIG. 1 is a perspective view of a convertible vehicle with the top in a raised operative position, depicting the convertible top utilizing a plurality of rigid panels in accordance with the principles of the present invention;

FIG. 2 is a perspective view similar to FIG. 1, illustrating the convertible top of the present invention being articulated to its folded storage position with the pliable covering in place;

FIG. 3 is a perspective view similar to FIG. 2, illustrating the convertible top being articulated to its folded storage position with the pliable covering removed and the front panel elevated;

FIG. 4 is a perspective view similar to FIGS. 1 and 2, illustrating the convertible top of the present invention in a lowered storage position with a portion of the convertible top acting as a cover that conceals the convertible top within the rear passenger compartment;

DETAILED DESCRIPTION OF THE PREFERRED EMBODIMENT

Figure 5:
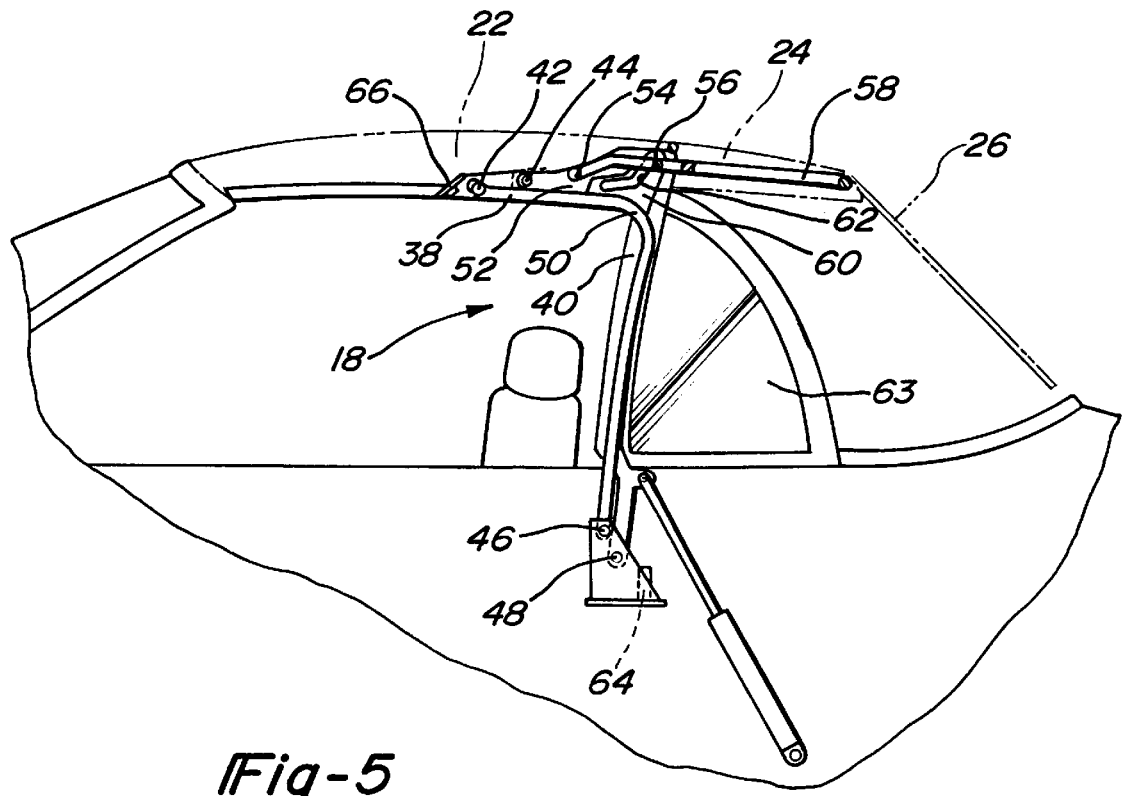
FIG. 5 is a vertical cross-sectional view taken along the central longitudinal axis of the vehicle illustrating the convertible top linkage assembly of the present invention in a raised operative position and further illustrating portions of the vehicle and the panels, thereby showing the positions of the linkage assembly with respect thereto.

Referring now to the drawings, and in particular FIG. 1, the preferred embodiment of the convertible top 10 of the present invention is shown. In this embodiment, the convertible top 10 is employed by an automotive vehicle 12 having both front 14 and rear 16 passenger compartments. The convertible top 10 is shown in a raised operative position and is of the type utilizing a linkage assembly 18 and a pliable cover 20, along with a front rigid panel 22, a rear rigid panel 24 and a back light panel 26. Back light panel 26 is simply attached to the pliable covering 20 stretched over the rigid panels 22 and 24. It is not pivotally connected to the linkage assembly 18. Rather, this panel 26 is held in place by the tension of the pliable covering 20 and the support of the rear panel member 24. Thus, the back light 24 can be made of either a rigid material, such as glass, as shown, or a pliable material (not shown).

As best illustrated by viewing FIGS. 1 through 4 and 5 through 7 sequentially, as the convertible top 10 is lowered, the linkage assembly 18 articulates the panels 22, 24 and 26 into a folded position and lowers them into the rear passenger compartment 16. The front rigid panel 22, which acts as a cover when lowered, is articulated to a position over the rear passenger compartment 16, thereby concealing both the rear passenger compartment 16 and the convertible top 10 therein. The beauty of this embodiment is that only minimal changes are necessary to adapt a stock, hardtop vehicle to accommodate it. As shown in FIGS. 1–4, a dedicated tonneau storage space is unnecessary since the rear passenger compartment 16 is utilized. With the rear passenger compartment 16 serving as the storage space, the trunk, rear suspension and rear seats do not have to be modified. Thus, many vehicles once thought to be impractical as convertible models can now can be adapted to the convertible top of the present invention.

For example, vehicles utilizing a unibody construction or a space frame construction are generally not cost effective for conventional convertible top designs due to space requirements for the rear suspension. However, since the present invention does not require an additional storage space, these types of vehicles can now be effectively adapted to this design. Despite the loss of the rear passenger compartment during operation in the convertible mode, vehicles can be adapted without completely sacrificing passenger space and without sacrificing any trunk space or suspension component space. Moreover, this design still provides for front and rear passenger seating with the convertible top in a raised operative position.

In addition to the present invention being readily adaptable to otherwise unadaptable vehicles, this design provides a number of other novel features. Most notably, even though the rear passenger space 16 is lost with the top 10 down, the vehicle 12 is attractively converted from a traditional "four seater" coupe, as shown in FIG. 1, to a "two seater" roadster, as shown in FIG. 4. The rigid front panel 22 is preferably injection molded or blow molded, however, such panels may be manufactured by other means such as by stamping or the like. Accordingly, these panels 22 and 24 are readily contoured to provide a smooth continuous exterior surface for the vehicle 12 in both raised and lowered positions.

Figure 8:
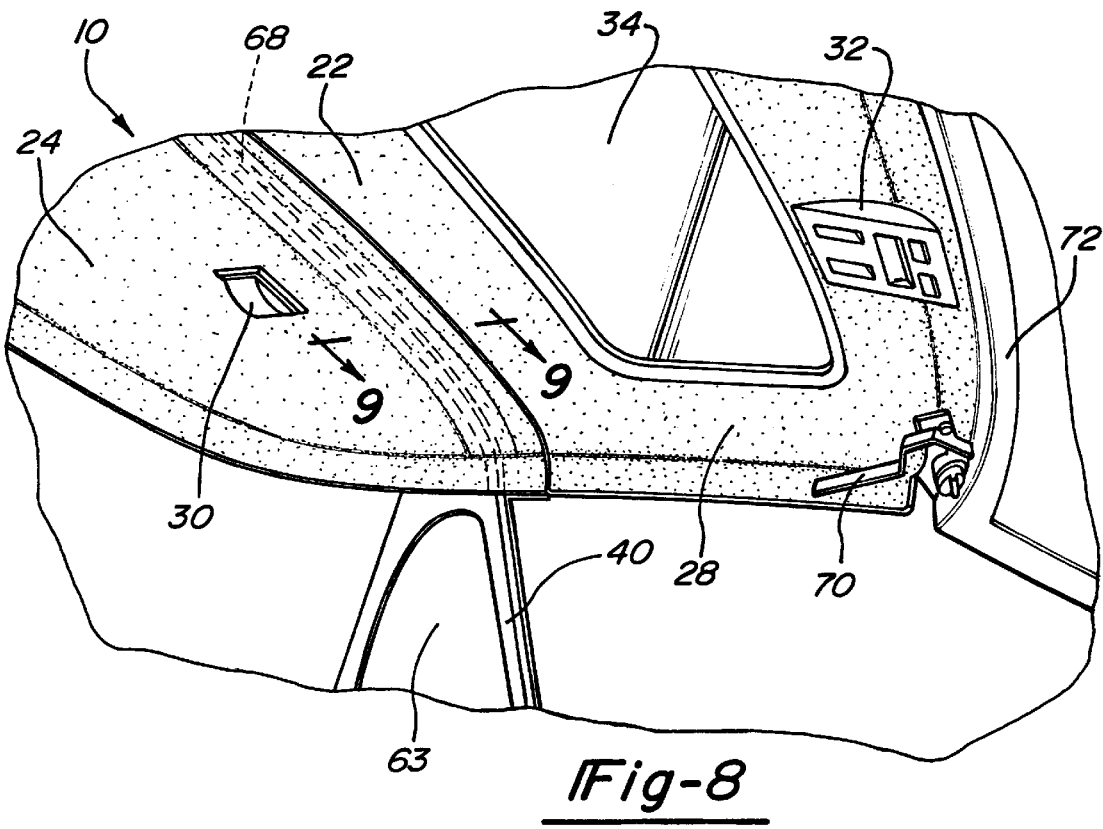
FIG. 8 is a perspective view illustrating the interior ceiling portion of the convertible top of the present invention.

Although a conventional pliable fabric covering can be utilized without the rigid panels, the rigid panels 22 and 24 allow for a sculpted effect, yielding a sporty aerodynamic look to the roadster. Moreover, these rigid panels 22 and 24 provide additional surface area to support the covering. Therefore, panels more readily accommodate a pliable covering 20 made from nylon, vinyl or the like that have show surfaces similar to the body panels of the vehicle 12. Alternatively, the panels 22 and 24 themselves can provide a show surface that matches the vehicle body panels, including a textured surface 28 for interior and/or exterior show surfaces as shown in FIG. 8.

The rigid panels 22 and 24 also provide structure to the convertible top 10 not found in conventional tops that utilize a series of bows and a pliable fabric cover. Besides the ability to precisely contour the top 10 in three dimensions, this added structure generally insulates the passenger compartment from both wind noise and the external environment, while preventing the wear associated with traditional convertible tops. This structure also provides rigidity to the convertible top 10, enabling it to support components such as conventional dome lights 30, overhead console panels 32, sun roofs 34, and the like, as shown in FIG. 8. Furthermore, the structure simplifies the attachment of weather stripping 36 as shown in FIGS. 1 and 2.

As can be seen from FIGS. 5 through 7 and 5A through 7A, the convertible top 10 of the present invention utilizes a unique, yet uncomplicated, linkage system 18 to articulate the panels 22 and 24 of the preferred embodiment. The front and rear panel members 22 and 24 are coupled to the vehicle 12 by a pair of identical balance links 38 and main links 40 on both the driver's side and passenger's side of the vehicle 12. One end of both links 38 and 40 is pivotally coupled to the front panel member 22 at pivot points 42 and 44, while the opposite ends of these links 38 and 40 are pivotally coupled to the vehicle at pivot points 46 and 48. The rear panel member 24 is pivotally coupled to intermediate portions 50 and 52 of both the balance links 38 and the main links 40 at pivot points 54 and 56 via a reinforcing member 58. This reinforcing member 58 extends transversely across the vehicle 12 and supports the rear panel 24 as shown in FIGS. 5A–7A. Pivot points 42, 44, 46, 48, 54 and 56 are preferably parallel to one another and parallel to a horizontal transverse axis of the vehicle 12.

Figure 6:
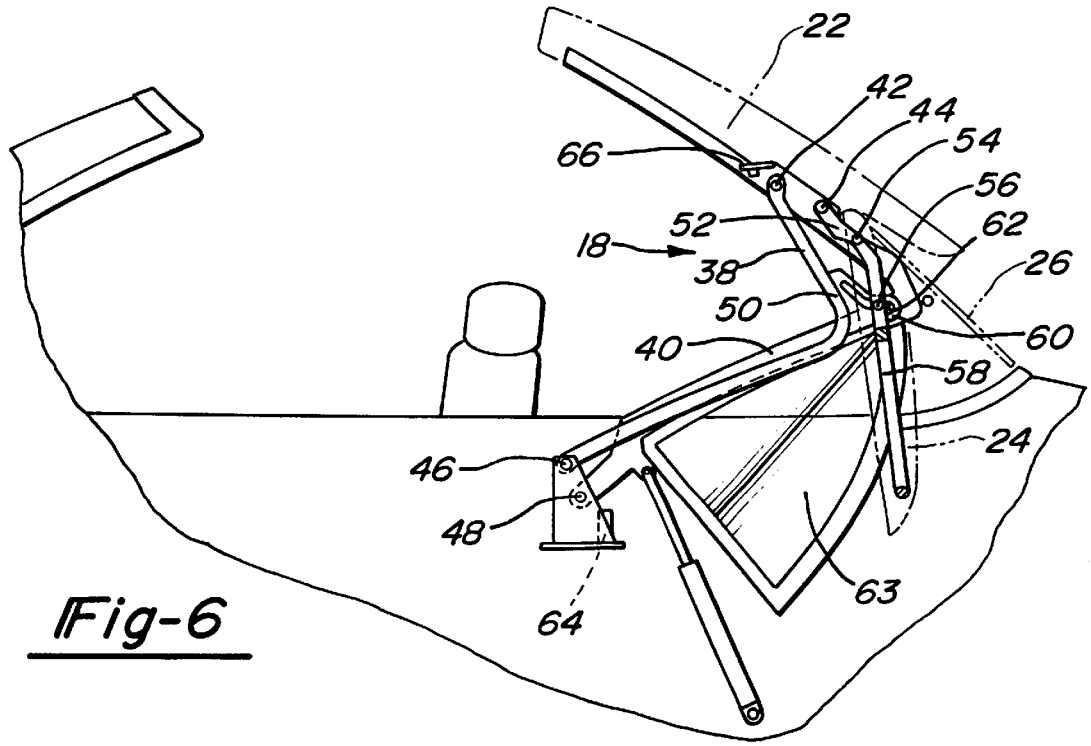
FIG. 6 is a cross-sectional view similar to FIG. 5 illustrating the linkage assembly articulating the panels into a folded position in accordance with the principles of the present invention.
Figure 7:
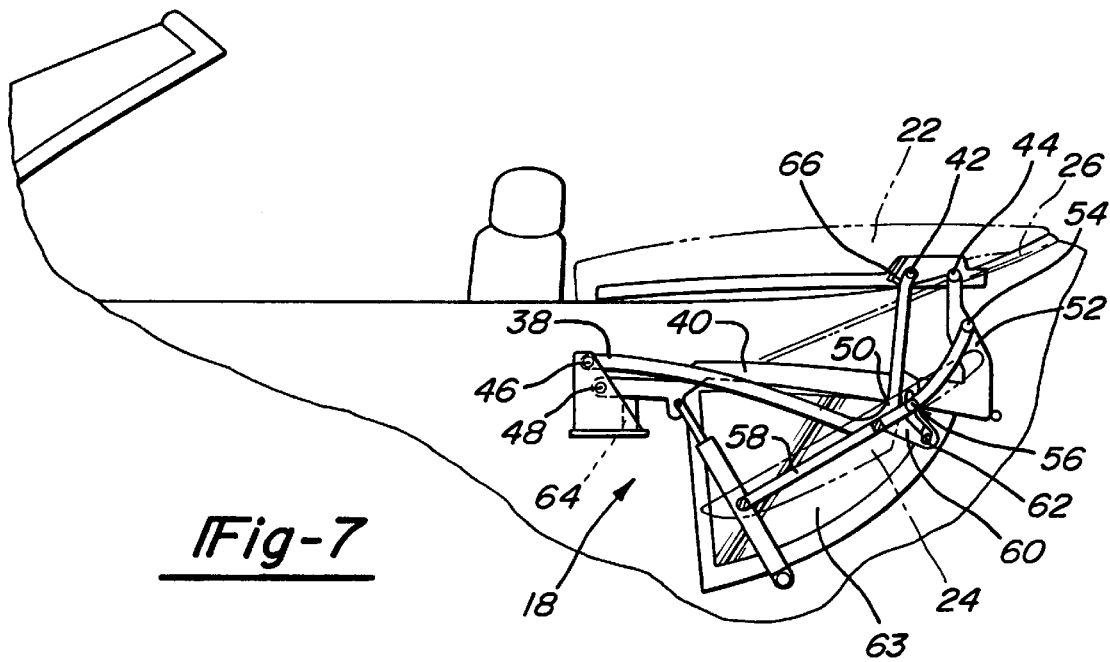
FIG. 7 is a cross-sectional view similar to FIGS. 5 and 6 illustrating the convertible top linkage assembly of the present in a lowered storage position.
Figure 5A:
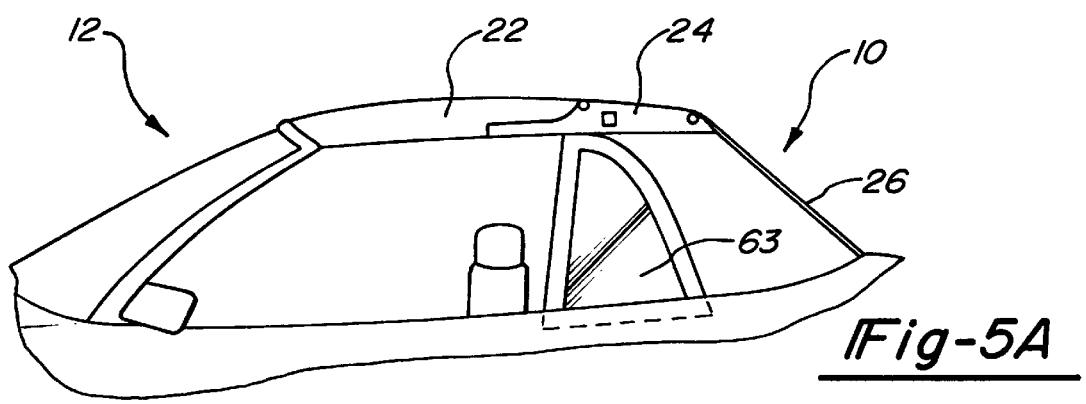
FIG. 5A is a diagrammatic view of the present invention illustrating the locations of the panels as shown in FIG. 5.
Figure 6A:
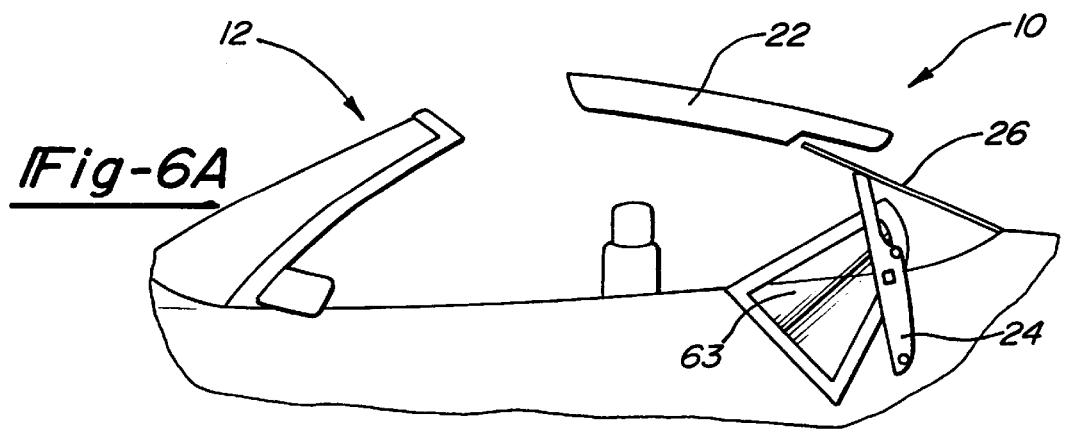
FIG. 6A is a diagrammatic view of the present invention illustrating the locations of the panels as shown in FIG. 6.

As best illustrated by viewing FIGS. 5 through 7 and 5A through 7A sequentially, this linkage assembly 18 permits the convertible top 10 to be articulated into a compact, folded storage position. As the convertible top 10 is pivoted rearward from its raised operative position, the rear panel 24 folds downwardly away from the pliable covering 20. Since the covering 20 is affixed to the front panel 22 and not the rear panel 24, the back light 26 collapses into the rear passenger compartment 16, as shown in FIGS. 2, 6 and 6A. The rear panel member 24, on the other hand, is precisely articulated into the rear passenger compartment 16. This articulation is controlled by a camming member 60 attached to the balance link 38, as shown in FIGS. 5 through 7. Controlling the articulation of a convertible top through the use of camming members is more fully disclosed in U.S. Pat. No. 5,161,852 issued to Alexander et al. on Nov. 10, 1992.

As best illustrated in FIG. 6, the reinforcing member 58 for the rear panel member 24 is pivotally coupled to an intermediate portion 52 of the main link at 56 and to a camming slot 62 defined by an intermediate portion 50 of the balance link at 54. The camming slot 62 is shaped such that as the convertible top 10 is articulated from its raised position to a lowered position, the rear panel 24 is articulated in a controlled manner. In other words, as the rear panel 24 pivots about its pivotal coupling 56 to the main link 10, the pivotal coupling 54 between the rear panel 24 and the camming slot 62 causes the rear panel 24 to follow the path of the slot 62. Accordingly, the rear panel member 24 is efficiently articulated within the rear passenger compartment 16 to a folded position as shown in FIG. 4. A rear quarter window 63, that is preferably rigidly affixed to the main link 40, is articulated along with the linkage assembly 18 into the rear passenger compartment 16.

As best shown in FIGS. 5, 5A, 6 and 6A, the front panel member 22 is pivotally coupled to the distal ends of both the main link 40 and the balance link 38 at 42 and 44. As the convertible top 10 is urged rearwardly, such that the rear panel member 24 and the back light 26 drop into the rear passenger compartment 16, the front panel member 22 moves rearward and downward. When completely lowered, the front panel 22 is positioned over the rear passenger compartment 16 and package shelf area, acting as a cover for the stored convertible top 10. As shown in the embodiment depicted in FIG. 4, the convertible vehicle 12 is thereby converted from a four-passenger coupe to a two-passenger roadster.

Note, the convertible top 10 of the present invention also lends itself to being stored in a traditional, dedicated tonneau space (not shown). As with the preferred embodiment, a portion of the convertible top 10 can be utilized as a cover, thereby eliminating the need for a separate boot or cover (not shown). In either case, when the convertible top 10 is in its lowered storage position, it is preferably held in place by adjustable stops 64 and 66. As best shown in FIG. 7, these adjustable stops 64 and 66 prevent the links 38 and 40 from articulating further in a downward direction. Thereafter, the convertible top 10 can be secured to the vehicle 12 with conventional latching means (not shown).

Figure 9:
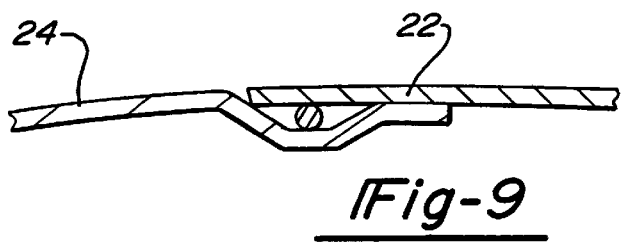
FIG. 9 is a cross-sectional view taken along section 9—9 in FIG. 8, illustrating the stabilizer bar with the front and rear panels in a raised operative position.
Figure 7A:
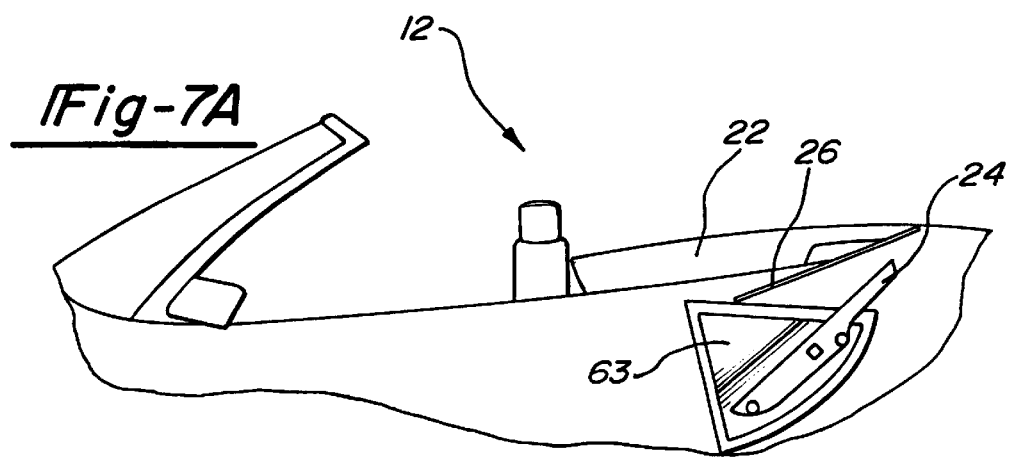
FIG. 7A is a diagrammatic view of the present invention illustrating the locations of the panels as shown in FIG. 7.

In order to stabilize the convertible top 10 as it is articulating between its raised and lowered positions, a stabilizing member 68 extends between the main links 40, transversely across the vehicle 12. This adds stability to the linkage assembly 18 by ensuring that all links, on both the passenger side of the vehicle and the driver's side of the vehicle, articulate together. When in a raised position, this stabilizer bar 68 is neatly concealed by portions of both the rear panel 24 and the front panel 22 and may abutt and support portions of both panels 22 and 24. As best shown in FIGS. 8 and 9, the stabilizer bar 68 is sandwiched between a rearward portion of the front panel 22 that overlaps a forward portion of the rear panel 24. Thus, the stabilizer bar 68 is undetectable from the interior of the vehicle 12.

In operation, the preferred convertible top 10 of the present invention can be manually or automatically lowered from its raised operative position as follows. An operator releases the convertible top 10 from its latched position by grasping the latch handle 70, shown in FIG. 8, and unlatching it from the header portion 72 of the windshield. Latch handle 70, located substantially above the driver's seat, controls a conventional latching mechanism (not shown). Accordingly, the driver of the vehicle 12 can conveniently release the latch from either the driver's seat or from outside the vehicle 12, through the driver's door window. Once unlatched, the roof is simply urged rearward, causing the panels 22 and 24 to articulate into a folded position. If the top is manually operated, as shown in FIG. 8, a gas cylinder 74 can be used to assist the lowering of the top. Otherwise, a convention actuator (not shown) can be used in place of the cylinder 74 to automatically raise and lower the top. In any event, as the convertible top 10 continues to be urged rearwardly, the folded convertible top 10 lowers into a storage position within the rear passenger compartment 16. The convertible top 10 is completely lowered when the adjustable stops 64 and 66 are engaged.

In short, the convertible top 10 of the present invention provides the unique ability to function as a convertible top in its raised operative position and to function as a tonneau cover in its lowered storage position. Moreover, the preferred embodiment of the present invention is designed to store in the rear passenger compartment 16 of a vehicle 12 such that the need for a dedicated tonneau or storage space can be eliminated. As such, when the convertible top 10 is in a raised position, this particular vehicle 12 has the appearance of a four-seat coupe. On the other hand, when the convertible top 10 is in its lowered position, the vehicle 12 has the appearance of a two-door roadster. Accordingly, the present invention has compensated for a number of disadvantages found in conventional convertible tops by creating a unique top that enhances both the looks and utility of the vehicle.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

We claim:

1. A convertible top for an automotive vehicle having a body portion, said convertible top comprising a roof for covering a passenger compartment when in a raised operative position, said roof being collapsible to a storage position within a storage compartment forward of a trunk of said automotive vehicle, an external surface of said roof providing a cover for said storage compartment when said convertible top is in said storage position, and a front edge of said roof being disposed immediately behind a front passenger seat when said roof is in said storage position, wherein said external surface is substantially flush with an adjacent portion of said body of said automotive vehicle when said convertible top is in said storage position.

2. The convertible top of claim 1 further comprising a dome light, said roof having a rigid panel, said rigid panel being substantially horizontal when in said raised position, wherein said roof panel provides structure for attaching said dome light to said convertible top.

3. The convertible top of claim 1 further comprising at least a forward portion of said roof having an uncovered and textured exterior show surface when in said raised position.

4. The convertible top of claim 1 further comprising an overhead console, and a fabric covered panel providing structure for attaching said overhead console to said convertible top.

5. The convertible top of claim 1 further comprising a rigid, glass back light secured to said roof.

6. The convertible top of claim 1 further comprising a rigid and substantially horizontal panel covered by a pliable covering material.

7. The convertible top of claim 1 wherein at least a substantially horizontal portion of said roof is made of relatively rigid plastic.

8. The convertible top of claim 1 further comprising a rigid, glass back window attached to said roof, said back window being stored within said storage compartment between said front seat and said trunk when said roof is collapsed.

9. The convertible top of claim 1 further comprising a pair or balance links each having a first end pivotably coupled to a front portion of said roof and having an opposite second end pivotably coupled to said vehicle.

10. A convertible top for an automotive vehicle, said convertible top comprising a fabric covered roof for covering portions of a passenger compartment when in a raised operative position, said roof being collapsible to a storage position within a storage compartment between a front seat and a trunk, at least a portion of said roof providing a cover for said storage compartment when said convertible top is in said storage position, and a front edge of said roof disposed immediately behind a front passenger seat when said roof is in said storage position.

11. The convertible top of claim 10 wherein said portion of said roof is disposed in a substantially horizontal position with an exterior surface viewable from outside of said vehicle when said roof is in said storage position.

12. The convertible top of claim 10 further comprising a rigid, glass back window attached to said roof, said back window being stored within said storage compartment between said front seat and said truck when said roof is collapsed.

13. The convertible top of claim 10 further comprising a pair of balance links each having a first end pivotably coupled to a front portions of said roof and having an opposite second end pivotably coupled to said vehicle.

14. The convertible top claim 10 further comprising a manually pivoted latch and latch handle mounted to said roof, said latch being fastenable to a windshield header of said vehicle.

15. An apparatus for an automotive vehicle having a body, said apparatus comprising:

a trunk compartment;

a first compartment of said body disposed forward of said trunk compartment, a front passenger seat located within said first compartment;

a second compartment disposed between said trunk compartment and said first compartment;

a fabric covered convertible top movable from a raised position covering said first compartment to a storage position longitudinally disposed in said second compartment without intrusion into said trunk compartment, a first portion of said convertible top stored in a substantially horizontal plane and having an external surface, said first portion being externally visible from outside of said vehicle when said convertible top is in said storage position, said external surface being substantially flush with an adjacent portion of said body of said automotive vehicle when said convertible top is in said storage position;

a back window fastened to a second portion of said convertible top, said back window being entirely disposed within said second compartment when said convertible top is in said storage position; and a pair of balance links each having a first end pivotally coupled to said first portion of said convertible top and having an opposite second end pivotally coupled to said vehicle.

16. An automotive vehicle having a convertible top, said vehicle comprising:

a passenger compartment having a seat;

a trunk lid covering a trunk;

a storage compartment disposed between said seat and said trunk;

a fabric covered roof for covering portions of said passenger compartment when in a raised operative position, said roof being collapsible to a storage position within said storage compartment;

at least a portion of said roof providing a cover for said storage compartment when said convertible top is in said storage position; and an external surface of said roof substantially flush with a substantially horizontal portion of said trunk lid when said convertible top is in said storage position.

\* \* \* \* \*

UNITED STATES PATENT AND TRADEMARK OFFICE
CERTIFICATE OF CORRECTION

PATENT NO.    : 5,810,422
DATED         : September 22, 1998
INVENTOR(S)   : George A. Corder; Charles C. Turney It is certified that error appears in the above-indentified patent and that said Letters Patent is hereby corrected as shown below:

On page 2 of the Title Page, under Foreign Patent Documents, reference 10, "1951081A1" should be -- 19518071A1 --.

Column 2, line 44, after "present" insert -- invention --.

Column 3, line 21, delete "can" (second occurrence).

Column 4, line 2, "·" should be -- , --.

Column 5, line 45, "convention" should be -- conventional --.

Column 6, line 35, after "horizontal" insert -- roof --.

Column 6, line 46, "or" should be -- of --.

Column 7, line 3, "portions" should be -- portion --.

Signed and Sealed this

Twenty-seventh Day of April, 1999

Attest:

Q. TODD DICKINSON

*Attesting Officer*    *Acting Commissioner of Patents and Trademarks*